(No Model.)

A. C. LUTZ.
PROCESS OF MANUFACTURING CIGAR HOLDERS AND OTHER ARTICLES FROM SOLUBLE AND NON-SOLUBLE GUMS.

No. 345,243.    Patented July 6, 1886.

Attest:
John Schuman.

Inventor.
Albert C. Lutz
by his Atty

UNITED STATES PATENT OFFICE.

ALBERT C. LUTZ, OF FLINT, MICHIGAN.

PROCESS OF MANUFACTURING CIGAR-HOLDERS AND OTHER ARTICLES FROM SOLUBLE AND NON-SOLUBLE GUMS.

SPECIFICATION forming part of Letters Patent No. 345,243, dated July 6, 1886.

Application filed April 22, 1886. Serial No. 199,815. (No model.)

*To all whom it may concern:*

Be it known that I, ALBERT C. LUTZ, of Flint, in the county of Genesee and State of Michigan, have invented new and useful Improvements in Processes of Manufacturing Cigar-Holders and other Articles from Soluble and Non-Soluble Gums; and I do hereby declare that the following is a full, clear, and exact description thereof, reference being had to the accompanying drawings, which form a part of this specification.

This invention relates to certain new and useful improvements in the manufacture of cigar and cigarette holders, boxes for holding articles that require to be kept moist, and other articles of a like character.

The invention consists in the employment of soluble gelatine as the base of which the article is formed, and this is afterward treated in a bath of any of the resinous gums that are not soluble in water, thereby producing an article that has the requisite strength, and which will be effectual for the purposes designed.

It is well known that gelatine is soluble in water, and at a comparatively low temperature, while the resinous gums are too friable to be usefully employed for the purposes described; but a combination of the two in the manner described produces an article having the necessary tensile strength and not liable to break.

While I wish by no means to confine myself to the manufacture of cigar or cigarette holders, I illustrate in the accompanying drawings, and particularly describe, how such articles are made by my process, with the full understanding that other articles may be made from the same materials, and by the same process, which would come within the spirit of my invention.

Figure 1:
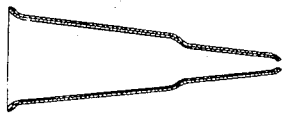
Figure 2:

Figure 1 is a representation of a cigar-holder of my improved manufacture. Fig. 2 is a representation of a cigarette holder or tip.

In order to accomplish my end, I use a mold of the proper external shape to form the interior wall of the holder, tip, or box. This mold I lubricate and then immerse the mold in the gelatine of commerce, and withdrawing the mold a film of gelatine will be found adhering to the mold. After this has "set" by exposure to the atmosphere, if the film is not thick enough, a second immersion may be had. Of course before this dipping is done the gelatine has been melted, preferably in a hot-water or steam bath. After the film has set on the mold it is removed from the mold or matrix and quickly immersed in a bath of limpid resinous gum, such as is not soluble in water or saliva. By this process I secure the requisite tensile strength and produce an article that will be unaffected by common moisture.

In cigarette or cigar holders, where it is not essential that the inner walls thereof should be insoluble, the treatment in the bath of resinous gum may be made before the article is removed from the mold upon which it is formed.

What I claim as my invention is—

The process herein described of manufacturing cigar and cigarette holders, boxes, and other like articles, such process consisting of first immersing a lubricated mold in limpid gelatine, then, after the film of gelatine has set, quickly immersing the same in a bath of limpid resinous gum which is not soluble in water or saliva, substantially as described.

ALBERT C. LUTZ.

Witnesses:
 H. S. SPRAGUE,
 CHARLES J. HUNT.